United States Patent
Costlow

(10) Patent No.: US 10,015,286 B1
(45) Date of Patent: Jul. 3, 2018

(54) SYSTEM AND METHOD FOR PROXYING HTTP SINGLE SIGN ON ACROSS NETWORK DOMAINS

(75) Inventor: Jeff J. Costlow, Bellevue, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 12/822,146

(22) Filed: Jun. 23, 2010

(51) Int. Cl.
- *H04L 9/32* (2006.01)
- *H04L 29/06* (2006.01)
- *G06F 15/173* (2006.01)
- *H04L 9/08* (2006.01)
- *G06F 17/30* (2006.01)
- *G06F 17/22* (2006.01)
- *G06F 21/00* (2013.01)

(52) U.S. Cl.
CPC ........ *H04L 69/14* (2013.01); *G06F 15/17306* (2013.01); *G06F 17/2235* (2013.01); *G06F 17/30014* (2013.01); *G06F 17/3089* (2013.01); *H04L 9/08* (2013.01); *H04L 9/0819* (2013.01); *H04L 9/321* (2013.01); *H04L 69/24* (2013.01)

(58) Field of Classification Search
CPC ............... G06F 21/33; G06F 15/17306; G06F 17/2235; G06F 17/24; G06F 17/30014; G06F 17/30864; G06F 17/30882; G06F 17/3089; G06F 21/41; H04L 69/14; H04L 69/24; H04L 9/08; H04L 9/0819; H04L 9/0891; H04L 9/321; H04L 9/3226
USPC ........ 713/168, 151, 162; 709/223, 224, 226, 709/213, 220, 228, 239, 243, 245; 380/259; 705/50; 726/4, 8
See application file for complete search history.

(56) References Cited

U.S. PATENT DOCUMENTS

| | | | |
|---|---|---|---|
| 3,950,735 | A | 4/1976 | Patel |
| 4,644,532 | A | 2/1987 | George et al. |
| 4,897,781 | A | 1/1990 | Change et al. |
| 4,965,772 | A | 10/1990 | Daniel et al. |
| 5,023,826 | A | 6/1991 | Patel |
| 5,053,953 | A | 10/1991 | Patel |
| 5,167,024 | A | 11/1992 | Smith et al. |

(Continued)

FOREIGN PATENT DOCUMENTS

| | | |
|---|---|---|
| EP | 0744850 A2 | 11/1996 |
| WO | WO 91/14326 | 9/1991 |

(Continued)

OTHER PUBLICATIONS

F5 Networks, Inc., "BIG-IP Controller with Exclusive OneConnect Content Switching Feature Provides a Breakthrough System for Maximizing Server and Network Performance," Press Release, May 8, 2001, 2 pages, Las Vegas, Nevada.

(Continued)

*Primary Examiner* — Gary S Garcia
(74) *Attorney, Agent, or Firm* — LeClairRyan PLLC

(57) ABSTRACT

A system and method to establish and maintain access between a secured network and a remote client device communicating with different security protocols. Once the system and method verify that the remote client device had the requisite credentials to access the secured network domain, the system and method are delegated to fetch a service ticket to one or more dedicated servers on behalf of remote client device. The system and method receives a service ticket from the dedicated server and forwards the service ticket to the remote client device to use the service.

20 Claims, 4 Drawing Sheets

(56) References Cited

U.S. PATENT DOCUMENTS

| | | | |
|---|---|---|---|
| 5,299,312 A | 3/1994 | Rocco, Jr. | |
| 5,327,529 A | 7/1994 | Fults et al. | |
| 5,367,635 A | 11/1994 | Bauer et al. | |
| 5,371,852 A | 12/1994 | Attanasio et al. | |
| 5,406,502 A | 4/1995 | Haramaty et al. | |
| 5,475,857 A | 12/1995 | Dally | |
| 5,517,617 A | 5/1996 | Sathaye et al. | |
| 5,519,694 A | 5/1996 | Brewer et al. | |
| 5,519,778 A | 5/1996 | Leighton et al. | |
| 5,521,591 A | 5/1996 | Arora et al. | |
| 5,528,701 A | 6/1996 | Aref | |
| 5,581,764 A | 12/1996 | Fitzgerald et al. | |
| 5,596,742 A | 1/1997 | Agarwal et al. | |
| 5,606,665 A | 2/1997 | Yang et al. | |
| 5,611,049 A | 3/1997 | Pitts | |
| 5,663,018 A | 9/1997 | Cummings et al. | |
| 5,752,023 A | 5/1998 | Choucri et al. | |
| 5,761,484 A | 6/1998 | Agarwal et al. | |
| 5,768,423 A | 6/1998 | Aref et al. | |
| 5,774,660 A | 6/1998 | Brendel et al. | |
| 5,790,554 A | 8/1998 | Pitcher et al. | |
| 5,802,052 A | 9/1998 | Venkataraman | |
| 5,812,550 A | 9/1998 | Sohn et al. | |
| 5,825,772 A | 10/1998 | Dobbins et al. | |
| 5,832,283 A | 11/1998 | Chou et al. | |
| 5,875,296 A | 2/1999 | Shi et al. | |
| 5,892,914 A | 4/1999 | Pitts | |
| 5,892,932 A | 4/1999 | Kim | |
| 5,919,247 A | 7/1999 | Van Hoff et al. | |
| 5,936,939 A | 8/1999 | Des Jardins et al. | |
| 5,941,988 A | 8/1999 | Bhagwat et al. | |
| 5,946,690 A | 8/1999 | Pitts | |
| 5,949,885 A | 9/1999 | Leighton | |
| 5,951,694 A | 9/1999 | Choquier et al. | |
| 5,959,990 A | 9/1999 | Frantz et al. | |
| 5,974,460 A | 10/1999 | Maddalozzo, Jr. et al. | |
| 5,983,281 A | 11/1999 | Ogle et al. | |
| 5,988,847 A | 11/1999 | McLaughlin et al. | |
| 6,006,260 A | 12/1999 | Barrick, Jr. et al. | |
| 6,006,264 A | 12/1999 | Colby et al. | |
| 6,026,452 A | 2/2000 | Pitts | |
| 6,028,857 A | 2/2000 | Poor | |
| 6,051,169 A | 4/2000 | Brown et al. | |
| 6,078,956 A | 6/2000 | Bryant et al. | |
| 6,085,234 A | 7/2000 | Pitts et al. | |
| 6,092,196 A | 7/2000 | Reiche | |
| 6,094,485 A | 7/2000 | Weinstein et al. | |
| 6,108,703 A | 8/2000 | Leighton et al. | |
| 6,111,876 A | 8/2000 | Frantz et al. | |
| 6,128,279 A | 10/2000 | O'Neil et al. | |
| 6,128,657 A | 10/2000 | Okanoya et al. | |
| 6,160,874 A | 12/2000 | Dickerman et al. | |
| 6,170,022 B1 | 1/2001 | Linville et al. | |
| 6,178,423 B1 | 1/2001 | Douceur et al. | |
| 6,182,139 B1 | 1/2001 | Brendel | |
| 6,192,051 B1 | 2/2001 | Lipman et al. | |
| 6,219,706 B1 | 4/2001 | Fan et al. | |
| 6,233,612 B1 | 5/2001 | Fnichtman et al. | |
| 6,246,684 B1 | 6/2001 | Chapman et al. | |
| 6,253,226 B1 | 6/2001 | Chidambaran et al. | |
| 6,253,230 B1 | 6/2001 | Couland et al. | |
| 6,263,368 B1 | 7/2001 | Martin | |
| 6,289,012 B1 | 9/2001 | Harrington et al. | |
| 6,298,380 B1 | 10/2001 | Coile et al. | |
| 6,327,622 B1 | 12/2001 | Jindal et al. | |
| 6,343,324 B1 | 1/2002 | Hubis et al. | |
| 6,347,339 B1 | 2/2002 | Morris et al. | |
| 6,360,270 B1 | 3/2002 | Cherkasova et al. | |
| 6,374,300 B2 | 4/2002 | Masters | |
| 6,396,833 B1 | 5/2002 | Zhang et al. | |
| 6,401,211 B1 * | 6/2002 | Brezak, Jr. | G06F 21/33 726/17 |
| 6,411,986 B1 | 6/2002 | Susai et al. | |
| 6,430,562 B1 | 8/2002 | Kardos et al. | |
| 6,434,081 B1 | 8/2002 | Johnson et al. | |
| 6,480,476 B1 | 11/2002 | Willars | |
| 6,484,203 B1 | 11/2002 | Porras et al. | |
| 6,484,261 B1 | 11/2002 | Wiegel | |
| 6,490,624 B1 | 12/2002 | Sampson et al. | |
| 6,510,135 B1 | 1/2003 | Almulhem et al. | |
| 6,510,458 B1 | 1/2003 | Berstis et al. | |
| 6,519,643 B1 | 2/2003 | Foulkes et al. | |
| 6,601,084 B1 | 7/2003 | Bhaskaran et al. | |
| 6,636,503 B1 | 10/2003 | Shiran et al. | |
| 6,636,894 B1 | 10/2003 | Short et al. | |
| 6,650,640 B1 | 11/2003 | Muller et al. | |
| 6,650,641 B1 | 11/2003 | Albert et al. | |
| 6,654,701 B2 | 11/2003 | Hailey | |
| 6,661,802 B1 | 12/2003 | Homberg et al. | |
| 6,683,873 B1 | 1/2004 | Kwok et al. | |
| 6,691,165 B1 | 2/2004 | Bruck et al. | |
| 6,694,517 B1 | 2/2004 | James et al. | |
| 6,708,187 B1 | 3/2004 | Shanumgam et al. | |
| 6,718,380 B1 | 4/2004 | Mohaban et al. | |
| 6,742,045 B1 | 5/2004 | Albert et al. | |
| 6,751,663 B1 | 6/2004 | Farrell et al. | |
| 6,754,228 B1 | 6/2004 | Ludwig | |
| 6,760,775 B1 | 7/2004 | Anerousis et al. | |
| 6,772,219 B1 | 8/2004 | Shobatake | |
| 6,779,039 B1 | 8/2004 | Bommareddy et al. | |
| 6,781,986 B1 | 8/2004 | Sabaa et al. | |
| 6,798,777 B1 | 9/2004 | Ferguson et al. | |
| 6,804,542 B1 | 10/2004 | Haartsen | |
| 6,816,901 B1 | 11/2004 | Sitaraman et al. | |
| 6,816,977 B2 | 11/2004 | Braknio et al. | |
| 6,826,698 B1 | 11/2004 | Minkin et al. | |
| 6,829,238 B2 | 12/2004 | Tokuyo et al. | |
| 6,868,082 B1 | 3/2005 | Allen, Jr. et al. | |
| 6,876,629 B2 | 4/2005 | Beshai et al. | |
| 6,876,654 B1 | 4/2005 | Hegde | |
| 6,888,836 B1 | 5/2005 | Cherkasova | |
| 6,928,082 B2 | 8/2005 | Liu et al. | |
| 6,947,985 B2 | 9/2005 | Hegli et al. | |
| 6,950,434 B1 | 9/2005 | Viswanath et al. | |
| 6,954,780 B2 | 10/2005 | Susai et al. | |
| 6,957,272 B2 | 10/2005 | Tallegas et al. | |
| 6,959,394 B1 | 10/2005 | Brickell et al. | |
| 6,975,592 B1 | 12/2005 | Seddigh et al. | |
| 6,978,298 B1 | 12/2005 | Kuehr-McLaren | |
| 6,986,040 B1 * | 1/2006 | Kramer | G06F 21/606 380/255 |
| 6,987,763 B2 | 1/2006 | Rochberger et al. | |
| 7,007,092 B2 | 2/2006 | Peiffer | |
| 7,039,946 B1 | 5/2006 | Binding | |
| 7,058,633 B1 | 6/2006 | Gnagy et al. | |
| 7,113,993 B1 | 9/2006 | Cappiello et al. | |
| 7,133,944 B2 | 11/2006 | Song et al. | |
| 7,139,792 B1 | 11/2006 | Mishra et al. | |
| 7,185,359 B2 | 2/2007 | Schmidt et al. | |
| 7,228,422 B2 | 6/2007 | Morioka et al. | |
| 7,287,082 B1 | 10/2007 | O'Toole, Jr. | |
| 7,295,827 B2 | 11/2007 | Liu et al. | |
| 7,308,703 B2 | 12/2007 | Wright et al. | |
| 7,308,709 B1 | 12/2007 | Brezak et al. | |
| 7,310,339 B1 | 12/2007 | Powers et al. | |
| 7,319,696 B2 | 1/2008 | Inoue et al. | |
| 7,321,926 B1 | 1/2008 | Zhang et al. | |
| 7,333,999 B1 | 2/2008 | Njemanze | |
| 7,343,413 B2 | 3/2008 | Gilde et al. | |
| 7,349,391 B2 | 3/2008 | Ben-Dor et al. | |
| 7,383,570 B2 | 6/2008 | Pinkas et al. | |
| 7,395,424 B2 | 7/2008 | Ashley et al. | |
| 7,398,552 B2 | 7/2008 | Pardee et al. | |
| 7,430,755 B1 | 9/2008 | Hughes et al. | |
| 7,433,962 B2 | 10/2008 | Janssen et al. | |
| 7,437,478 B2 | 10/2008 | Yokota et al. | |
| 7,454,480 B2 | 11/2008 | Labio et al. | |
| 7,490,162 B1 | 2/2009 | Masters | |
| 7,500,243 B2 | 3/2009 | Huetsch et al. | |
| 7,500,269 B2 | 3/2009 | Huotari et al. | |
| 7,505,795 B1 | 3/2009 | Lim et al. | |
| 7,516,492 B1 | 4/2009 | Nisbet et al. | |
| 7,522,581 B2 | 4/2009 | Acharya et al. | |
| 7,526,541 B2 | 4/2009 | Roese et al. | |

(56) References Cited

U.S. PATENT DOCUMENTS

| | | |
|---|---|---|
| 7,558,197 B1 | 7/2009 | Sindhu et al. |
| 7,580,971 B1 | 8/2009 | Gollapudi et al. |
| 7,590,732 B2 | 9/2009 | Rune |
| 7,624,424 B2 | 11/2009 | Morita et al. |
| 7,644,137 B2 | 1/2010 | Bozak et al. |
| 7,649,998 B2 | 1/2010 | Harran |
| 7,668,166 B1 | 2/2010 | Rekhter et al. |
| 7,680,915 B2 | 3/2010 | Still et al. |
| 7,689,710 B2 | 3/2010 | Tang et al. |
| 7,724,657 B2 | 5/2010 | Rao et al. |
| 7,725,093 B2 | 5/2010 | Sengupta et al. |
| 7,725,657 B2 | 5/2010 | Hasenplaugh et al. |
| 7,778,187 B2 | 8/2010 | Chaturvedi et al. |
| 7,801,978 B1 | 9/2010 | Susai et al. |
| 7,808,913 B2 | 10/2010 | Ansari et al. |
| 7,831,662 B2 | 11/2010 | Clark et al. |
| 7,853,782 B1 | 12/2010 | Geddes |
| 7,870,380 B2 | 1/2011 | VanHeyningen |
| 7,908,314 B2 | 3/2011 | Yamaguchi et al. |
| 7,925,908 B2 | 4/2011 | Kim |
| 7,930,365 B2 | 4/2011 | Dixit et al. |
| 7,933,946 B2 | 4/2011 | Livshits et al. |
| 7,945,908 B1 | 5/2011 | Waldspurger et al. |
| 7,984,141 B2 | 7/2011 | Gupta et al. |
| 7,996,886 B1 | 8/2011 | Hughes et al. |
| 8,041,022 B1 | 10/2011 | Andreasen et al. |
| 8,103,781 B1 | 1/2012 | Wu et al. |
| 8,130,650 B2 | 3/2012 | Allen, Jr. et al. |
| 8,149,819 B2 | 4/2012 | Kobayashi et al. |
| 8,185,945 B1 | 5/2012 | Eatough et al. |
| 8,189,567 B2 | 5/2012 | Kavanagh et al. |
| 8,199,757 B2 | 6/2012 | Pani et al. |
| 8,205,246 B2 | 6/2012 | Shatzkamer et al. |
| 8,239,954 B2 | 8/2012 | Wobber et al. |
| 8,274,895 B2 | 9/2012 | Rahman et al. |
| 8,321,908 B2 | 11/2012 | Gai et al. |
| 8,351,333 B2 | 1/2013 | Rao et al. |
| 8,380,854 B2 | 2/2013 | Szabo |
| 8,417,817 B1 | 4/2013 | Jacobs |
| 8,447,871 B1 | 5/2013 | Szabo |
| 8,447,970 B2 | 5/2013 | Klein et al. |
| 8,452,876 B1 | 5/2013 | Williams et al. |
| 8,464,265 B2 | 6/2013 | Worley |
| 8,468,247 B1 | 6/2013 | Richardson et al. |
| 8,468,267 B2 | 6/2013 | Yigang |
| 8,521,851 B1 | 8/2013 | Richardson et al. |
| 8,521,880 B1 | 8/2013 | Richardson et al. |
| 8,359,224 B2 | 9/2013 | Henderson et al. |
| 8,539,224 B2 | 9/2013 | Henderson et al. |
| 8,566,474 B2 | 10/2013 | Kanode et al. |
| 8,578,050 B2 | 11/2013 | Craig et al. |
| 8,606,921 B2 | 12/2013 | Vasquez et al. |
| 8,613,071 B2 | 12/2013 | Day |
| 8,615,022 B2 | 12/2013 | Harrison et al. |
| 8,646,067 B2 | 2/2014 | Agarwal et al. |
| 8,665,868 B2 | 3/2014 | Kay |
| 8,701,179 B1 | 4/2014 | Penno et al. |
| 8,725,836 B2 | 5/2014 | Lowery et al. |
| 8,726,338 B2 | 5/2014 | Narayanaswamy et al. |
| 8,737,304 B2 | 5/2014 | Karuturi et al. |
| 8,745,266 B2 | 6/2014 | Agarwal |
| 8,778,665 B2 | 7/2014 | Gilde et al. |
| 8,788,665 B2 | 7/2014 | Gilde et al. |
| 8,788,669 B2 | 7/2014 | Gilde et al. |
| 8,804,504 B1 | 8/2014 | Chen |
| 8,819,109 B1 | 8/2014 | Krishnamurthy et al. |
| 8,819,419 B2 | 8/2014 | Carlson et al. |
| 8,819,768 B1 | 8/2014 | Koeten et al. |
| 8,830,874 B2 | 9/2014 | Cho et al. |
| 8,873,753 B2 | 10/2014 | Parker |
| 8,875,274 B2 | 10/2014 | Montemurro et al. |
| 8,886,981 B1 | 11/2014 | Baumann et al. |
| 8,908,545 B1 | 12/2014 | Chen et al. |
| 8,954,080 B2 | 2/2015 | Janakiraman et al. |
| 9,036,529 B2 | 5/2015 | Erickson et al. |
| 9,037,166 B2 | 5/2015 | de Wit et al. |
| 9,047,259 B1 | 6/2015 | Ho et al. |
| 9,077,554 B1 | 7/2015 | Szabo |
| 9,083,760 B1 | 7/2015 | Hughes et al. |
| 2001/0009554 A1 | 7/2001 | Katseff et al. |
| 2001/0023442 A1 | 9/2001 | Masters |
| 2002/0010783 A1 | 1/2002 | Primak et al. |
| 2002/0032777 A1 | 3/2002 | Kawata et al. |
| 2002/0046291 A1 | 4/2002 | O'Callaghan et al. |
| 2002/0049842 A1 | 4/2002 | Huetsch et al. |
| 2002/0059428 A1 | 5/2002 | Susai et al. |
| 2002/0083067 A1 | 6/2002 | Tamayo et al. |
| 2002/0095498 A1 | 7/2002 | Chanda et al. |
| 2002/0112061 A1 | 8/2002 | Shih et al. |
| 2002/0138615 A1 | 9/2002 | Schmeling |
| 2002/0143785 A1 | 10/2002 | Pugh |
| 2002/0161913 A1 | 10/2002 | Gonzalez et al. |
| 2002/0178366 A1 | 11/2002 | Ofir |
| 2002/0188753 A1 | 12/2002 | Tang et al. |
| 2002/0194342 A1 | 12/2002 | Lu et al. |
| 2002/0198993 A1 | 12/2002 | Cudd et al. |
| 2003/0037070 A1 | 2/2003 | Marston |
| 2003/0046291 A1 | 3/2003 | Fascenda |
| 2003/0065653 A1 | 4/2003 | Overton et al. |
| 2003/0065951 A1 | 4/2003 | Igeta et al. |
| 2003/0069918 A1 | 4/2003 | Lu et al. |
| 2003/0069974 A1 | 4/2003 | Lu et al. |
| 2003/0070069 A1 | 4/2003 | Belapurkar et al. |
| 2003/0086415 A1 | 5/2003 | Bernhard et al. |
| 2003/0105807 A1 | 6/2003 | Thompson et al. |
| 2003/0105983 A1 | 6/2003 | Brakmo et al. |
| 2003/0108052 A1 | 6/2003 | Inoue et al. |
| 2003/0120948 A1 | 6/2003 | Schmidt et al. |
| 2003/0128708 A1 | 7/2003 | Inoue et al. |
| 2003/0145062 A1 | 7/2003 | Sharma et al. |
| 2003/0145233 A1 | 7/2003 | Poletto et al. |
| 2003/0163576 A1 | 8/2003 | Janssen et al. |
| 2003/0188193 A1* | 10/2003 | Venkataramappa H04L 63/0807 726/10 |
| 2003/0208596 A1 | 11/2003 | Carolan et al. |
| 2003/0225485 A1 | 12/2003 | Fritz et al. |
| 2004/0003287 A1* | 1/2004 | Zissimopoulos ... H04L 63/0428 726/10 |
| 2004/0010713 A1* | 1/2004 | Vollbrecht ......... H04L 12/2856 726/10 |
| 2004/0072569 A1 | 4/2004 | Omae et al. |
| 2004/0103283 A1* | 5/2004 | Hornak ................ H04L 29/06 713/175 |
| 2004/0111523 A1 | 6/2004 | Hall et al. |
| 2004/0111621 A1 | 6/2004 | Himberger et al. |
| 2004/0117493 A1 | 6/2004 | Bazot et al. |
| 2004/0128499 A1* | 7/2004 | Peterka ................ H04L 63/062 713/155 |
| 2004/0151186 A1 | 8/2004 | Akama |
| 2004/0192312 A1 | 9/2004 | Li et al. |
| 2004/0199762 A1 | 10/2004 | Carlson et al. |
| 2004/0210663 A1 | 10/2004 | Phillips et al. |
| 2004/0255000 A1 | 12/2004 | Sirnionescu et al. |
| 2004/0264472 A1 | 12/2004 | Oliver et al. |
| 2004/0264481 A1 | 12/2004 | Darling et al. |
| 2004/0267920 A1 | 12/2004 | Hydrie et al. |
| 2004/0267948 A1 | 12/2004 | Oliver et al. |
| 2004/0268118 A1* | 12/2004 | Bazan Bejarano ..... H04L 63/08 713/151 |
| 2004/0268152 A1 | 12/2004 | Xia |
| 2004/0268358 A1 | 12/2004 | Darling et al. |
| 2005/0004887 A1 | 1/2005 | Igakura et al. |
| 2005/0005114 A1* | 1/2005 | Medvinsky ............. G06F 21/10 713/168 |
| 2005/0015585 A1* | 1/2005 | Kurose ............... H04L 63/0807 713/155 |
| 2005/0021736 A1 | 1/2005 | Carusi et al. |
| 2005/0027837 A1 | 2/2005 | Roese |
| 2005/0027869 A1 | 2/2005 | Johnson |
| 2005/0044213 A1 | 2/2005 | Kobayashi et al. |
| 2005/0052440 A1 | 3/2005 | Kim et al. |
| 2005/0055435 A1 | 3/2005 | Gbadegesin et al. |
| 2005/0071283 A1 | 3/2005 | Randle et al. |

(56) References Cited

U.S. PATENT DOCUMENTS

| | | |
|---|---|---|
| 2005/0078604 A1 | 4/2005 | Yim |
| 2005/0108575 A1* | 5/2005 | Yung .................. H04L 63/0807 726/4 |
| 2005/0122942 A1 | 6/2005 | Rhee et al. |
| 2005/0122977 A1 | 6/2005 | Lieberman |
| 2005/0138198 A1 | 6/2005 | May |
| 2005/0154837 A1 | 7/2005 | Keohane et al. |
| 2005/0187866 A1 | 8/2005 | Lee |
| 2005/0188220 A1* | 8/2005 | Nilsson .................. H04L 63/04 726/5 |
| 2005/0198310 A1 | 9/2005 | Kim et al. |
| 2005/0262238 A1 | 11/2005 | Reeves et al. |
| 2005/0273592 A1 | 12/2005 | Pryor et al. |
| 2005/0283823 A1 | 12/2005 | Okajo et al. |
| 2005/0288939 A1 | 12/2005 | Peled et al. |
| 2006/0031520 A1 | 2/2006 | Bedekar et al. |
| 2006/0036764 A1 | 2/2006 | Yokota et al. |
| 2006/0041761 A1* | 2/2006 | Neumann ............... G06F 21/32 713/189 |
| 2006/0059267 A1 | 3/2006 | Cugi et al. |
| 2006/0077902 A1 | 4/2006 | Kannan et al. |
| 2006/0077986 A1 | 4/2006 | Rune |
| 2006/0083205 A1 | 4/2006 | Buddhikot et al. |
| 2006/0095573 A1 | 5/2006 | Carle et al. |
| 2006/0106802 A1 | 5/2006 | Giblin et al. |
| 2006/0112176 A1 | 5/2006 | Liu et al. |
| 2006/0112272 A1 | 5/2006 | Morioka et al. |
| 2006/0129684 A1 | 6/2006 | Datta |
| 2006/0135198 A1 | 6/2006 | Lee |
| 2006/0156416 A1 | 7/2006 | Huotari et al. |
| 2006/0161577 A1 | 7/2006 | Kulkarni et al. |
| 2006/0168070 A1 | 7/2006 | Thompson et al. |
| 2006/0171365 A1 | 8/2006 | Borella |
| 2006/0179153 A1 | 8/2006 | Lee et al. |
| 2006/0182103 A1 | 8/2006 | Martini et al. |
| 2006/0184647 A1 | 8/2006 | Dixit et al. |
| 2006/0209853 A1 | 9/2006 | Hidaka et al. |
| 2006/0230148 A1 | 10/2006 | Forecast et al. |
| 2006/0233106 A1 | 10/2006 | Achlioptas et al. |
| 2006/0242300 A1 | 10/2006 | Yumoto et al. |
| 2006/0268704 A1 | 11/2006 | Ansari et al. |
| 2006/0291483 A1 | 12/2006 | Sela |
| 2006/0294054 A1 | 12/2006 | Kudo et al. |
| 2006/0294366 A1 | 12/2006 | Nadalin et al. |
| 2007/0006293 A1 | 1/2007 | Balakrishnan et al. |
| 2007/0016662 A1 | 1/2007 | Desai et al. |
| 2007/0019658 A1 | 1/2007 | Park et al. |
| 2007/0038853 A1 | 2/2007 | Day |
| 2007/0297410 A1 | 2/2007 | Yoon et al. |
| 2007/0050843 A1 | 3/2007 | Manville et al. |
| 2007/0058670 A1 | 3/2007 | Konduru et al. |
| 2007/0064661 A1 | 3/2007 | Sood et al. |
| 2007/0083646 A1 | 4/2007 | Miller et al. |
| 2007/0088822 A1 | 4/2007 | Coile et al. |
| 2007/0106796 A1 | 5/2007 | Kudo et al. |
| 2007/0107048 A1* | 5/2007 | Halls ..................... G06F 21/33 726/4 |
| 2007/0118879 A1* | 5/2007 | Yeun ................... H04L 63/0815 726/3 |
| 2007/0174491 A1 | 7/2007 | Still et al. |
| 2007/0220598 A1* | 9/2007 | Salowey ............... H04L 9/0841 726/10 |
| 2007/0233809 A1 | 10/2007 | Brownell et al. |
| 2007/0258451 A1 | 11/2007 | Bouat |
| 2007/0263874 A1 | 11/2007 | Harran |
| 2007/0297551 A1 | 12/2007 | Choi |
| 2008/0008202 A1 | 1/2008 | Terrell et al. |
| 2008/0025297 A1 | 1/2008 | Kashyap |
| 2008/0031258 A1 | 2/2008 | Acharya et al. |
| 2008/0034136 A1 | 2/2008 | Ulenas |
| 2008/0072303 A1* | 3/2008 | Syed .................. H04L 63/0807 726/10 |
| 2008/0104390 A1 | 5/2008 | VanHeyningen |
| 2008/0120370 A1 | 5/2008 | Chan et al. |
| 2008/0133518 A1 | 6/2008 | Kapoor et al. |
| 2008/0134311 A1* | 6/2008 | Medvinsky ............. G06F 21/33 726/7 |
| 2008/0148340 A1 | 6/2008 | Powell et al. |
| 2008/0148381 A1 | 6/2008 | Aaron |
| 2008/0159145 A1 | 7/2008 | Muthukrishnan et al. |
| 2008/0165801 A1 | 7/2008 | Sheppard |
| 2008/0178278 A1 | 7/2008 | Grinstein et al. |
| 2008/0194296 A1 | 8/2008 | Roundtree |
| 2008/0201599 A1 | 8/2008 | Ferraiolo et al. |
| 2008/0205613 A1 | 8/2008 | Lopez |
| 2008/0222646 A1 | 9/2008 | Sigal et al. |
| 2008/0225710 A1 | 9/2008 | Raja et al. |
| 2008/0229415 A1 | 9/2008 | Kapoor et al. |
| 2008/0235508 A1 | 9/2008 | Ran et al. |
| 2008/0239986 A1 | 10/2008 | Xu et al. |
| 2008/0253395 A1 | 10/2008 | Pandva |
| 2008/0256224 A1 | 10/2008 | Kaji et al. |
| 2008/0279200 A1 | 11/2008 | Shatzkamer et al. |
| 2008/0282354 A1 | 11/2008 | Wobber et al. |
| 2008/0288661 A1 | 11/2008 | Galles |
| 2008/0301760 A1 | 12/2008 | Lim |
| 2008/0316922 A1 | 12/2008 | Riddle et al. |
| 2009/0028337 A1* | 1/2009 | Balabine ............... H04L 63/0492 380/277 |
| 2009/0049230 A1 | 2/2009 | Pandva |
| 2009/0070617 A1 | 3/2009 | Arirnilli et al. |
| 2009/0077619 A1 | 3/2009 | Boyce |
| 2009/0094610 A1 | 4/2009 | Sukirya |
| 2009/0110200 A1* | 4/2009 | Srinivas ................ G06F 21/335 380/279 |
| 2009/0119504 A1* | 5/2009 | van Os .................. H04L 9/3271 713/153 |
| 2009/0125496 A1 | 5/2009 | Wexler et al. |
| 2009/0125532 A1 | 5/2009 | Wexler et al. |
| 2009/0125625 A1 | 5/2009 | Shim et al. |
| 2009/0132807 A1 | 5/2009 | Schneider |
| 2009/0138749 A1 | 5/2009 | Moll et al. |
| 2009/0141891 A1* | 6/2009 | Boyen ................... G06F 21/602 380/44 |
| 2009/0157678 A1 | 6/2009 | Turk |
| 2009/0158032 A1* | 6/2009 | Costa .................. H04L 63/0442 713/156 |
| 2009/0193126 A1 | 7/2009 | Agarwal et al. |
| 2009/0193513 A1 | 7/2009 | Agarwal et al. |
| 2009/0196282 A1 | 8/2009 | Fellman et al. |
| 2009/0228956 A1 | 9/2009 | He et al. |
| 2009/0248893 A1 | 10/2009 | Richardson et al. |
| 2009/0271847 A1* | 10/2009 | Karjala ............... H04L 63/0807 726/6 |
| 2009/0287935 A1* | 11/2009 | Aull ...................... H04L 9/3263 713/182 |
| 2009/0296624 A1 | 12/2009 | Ryu et al. |
| 2009/0300407 A1 | 12/2009 | Kamath et al. |
| 2009/0328219 A1 | 12/2009 | Narayanaswamy |
| 2010/0011434 A1 | 1/2010 | Kay |
| 2010/0017846 A1 | 1/2010 | Huang et al. |
| 2010/0023582 A1 | 1/2010 | Pedersen et al. |
| 2010/0071048 A1* | 3/2010 | Novak ................... H04L 63/08 726/10 |
| 2010/0100953 A1* | 4/2010 | Mowers ............... H04L 63/0807 726/10 |
| 2010/0115236 A1 | 5/2010 | Bataineh et al. |
| 2010/0122091 A1* | 5/2010 | Huang .................. H04L 63/067 713/171 |
| 2010/0150154 A1 | 6/2010 | Viger et al. |
| 2010/0150169 A1 | 6/2010 | Brown |
| 2010/0154031 A1 | 6/2010 | Montemurro et al. |
| 2010/0165877 A1 | 7/2010 | Shukla et al. |
| 2010/0188976 A1 | 7/2010 | Rahman et al. |
| 2010/0189052 A1 | 7/2010 | Kavanagh et al. |
| 2010/0192201 A1 | 7/2010 | Shimoni |
| 2010/0211658 A1 | 8/2010 | Hoogerwerf |
| 2010/0242092 A1 | 9/2010 | Harris et al. |
| 2010/0251330 A1 | 9/2010 | Kroeselberg et al. |
| 2010/0279733 A1 | 11/2010 | Karsten et al. |
| 2010/0299451 A1 | 11/2010 | Yigang et al. |
| 2010/0318784 A1 | 12/2010 | Rao |

(56) References Cited

U.S. PATENT DOCUMENTS

| | | | |
|---|---|---|---|
| 2010/0322250 A1 | 12/2010 | Shetty et al. | |
| 2010/0325277 A1 | 12/2010 | Muthiah et al. | |
| 2010/0325686 A1 | 12/2010 | Davis et al. | |
| 2011/0010542 A1* | 1/2011 | Choi | H04L 9/3213 713/168 |
| 2011/0040889 A1 | 2/2011 | Garrett et al. | |
| 2011/0047620 A1 | 2/2011 | Mahaffey et al. | |
| 2011/0066718 A1 | 3/2011 | Susai et al. | |
| 2011/0107077 A1 | 5/2011 | Henderson et al. | |
| 2011/0119307 A1 | 5/2011 | Unger et al. | |
| 2011/0153822 A1 | 6/2011 | Rajan et al. | |
| 2011/0154017 A1 | 6/2011 | Edstrom et al. | |
| 2011/0154443 A1 | 6/2011 | Thakur et al. | |
| 2011/0173295 A1 | 7/2011 | Bakke et al. | |
| 2011/0184733 A1 | 7/2011 | Yu et al. | |
| 2011/0197059 A1* | 8/2011 | Klein | H04L 9/083 713/155 |
| 2011/0202676 A1 | 8/2011 | Craig et al. | |
| 2011/0213966 A1* | 9/2011 | Fu | H04L 63/0807 713/158 |
| 2011/0246800 A1 | 10/2011 | Accpadi et al. | |
| 2011/0273984 A1 | 11/2011 | Hsu et al. | |
| 2011/0277016 A1 | 11/2011 | Hockings et al. | |
| 2011/0282997 A1 | 11/2011 | Prince et al. | |
| 2011/0289550 A1 | 11/2011 | Nakae | |
| 2011/0296183 A1* | 12/2011 | Banerjee | G06F 21/33 713/170 |
| 2011/0314178 A1 | 12/2011 | Kanode et al. | |
| 2011/0321122 A1 | 12/2011 | Mwangi et al. | |
| 2011/0321135 A1 | 12/2011 | Dickerson | |
| 2012/0016994 A1 | 1/2012 | Nakamura et al. | |
| 2012/0030341 A1 | 2/2012 | Jensen et al. | |
| 2012/0039341 A1 | 2/2012 | Latif et al. | |
| 2012/0041965 A1 | 2/2012 | Vasquez et al. | |
| 2012/0063314 A1 | 3/2012 | Pignataro et al. | |
| 2012/0066489 A1 | 3/2012 | Ozaki et al. | |
| 2012/0079055 A1 | 3/2012 | Robinson | |
| 2012/0101952 A1 | 4/2012 | Raleigh et al. | |
| 2012/0124372 A1 | 5/2012 | Dilley et al. | |
| 2012/0191847 A1 | 7/2012 | Nas et al. | |
| 2012/0198043 A1 | 8/2012 | Hesketh et al. | |
| 2012/0224531 A1 | 9/2012 | Karuturi et al. | |
| 2012/0311153 A1 | 12/2012 | Morgan | |
| 2012/0317266 A1 | 12/2012 | Abbott | |
| 2013/0029726 A1 | 1/2013 | Berionne et al. | |
| 2013/0031060 A1 | 1/2013 | Lowery et al. | |
| 2013/0091002 A1 | 4/2013 | Christie et al. | |
| 2013/0111542 A1 | 5/2013 | Shieh | |
| 2013/0163758 A1 | 6/2013 | Swaminathan et al. | |
| 2013/0198322 A1 | 8/2013 | Oran et al. | |
| 2013/0205361 A1 | 8/2013 | Narayanaswamy et al. | |
| 2013/0336122 A1 | 12/2013 | Baruah et al. | |
| 2014/0025823 A1 | 1/2014 | Szabo et al. | |
| 2014/0040478 A1 | 2/2014 | Hsu et al. | |
| 2014/0059678 A1 | 2/2014 | Parker | |
| 2014/0095661 A1 | 4/2014 | Knowles et al. | |
| 2014/0162705 A1 | 6/2014 | de Wit et al. | |
| 2014/0171089 A1 | 6/2014 | Janakiraman et al. | |
| 2014/0269484 A1 | 9/2014 | Dankberg et al. | |
| 2014/0317404 A1 | 10/2014 | Carlson et al. | |

FOREIGN PATENT DOCUMENTS

| | | |
|---|---|---|
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |
| WO | WO 2008/067758 | 6/2008 |

OTHER PUBLICATIONS

Crescendo Networks, "Application Layer Processing (ALP)," 2003-2009, pp. 168-186, Chapter 9, CN-5000E/5500E, Foxit Software Company.

Fielding et al., "Hypertext Transfer Protocol—HTTP/1.1," Network Working Group, RFC: 2616, Jun. 1999, pp. 1-176, The Internet Society.

"Windows Server 2003 Kerberos Extensions," Microsoft TechNet, 2003 (Updated Jul. 31, 2004), http:/technet.microsoft.com/en-us/library/cc738207, Microsoft Corporation.

Mac Vittie, L., "Message-Based Load Balancing: Using F5 solutions to address the challenges of scaling Diameter, Radius, and message-oriented protocols", F5 Technical Brief, 2005, pp. 1-9, F5 Networks Inc., Seattle, Washington.

International Search Report and The Written Opinion for International Patent Application No. PCT/US2013/026615 (dated Jul. 4, 2013).

F5 Networks Inc., "Configuration Guide for Local Traffic Management," F5 Networks Inc., Jan. 2006, version 9.2.2, 406 pgs.

U.S. Appl. No. 13/400,398 to Paul Jiang, filed Feb. 20, 2012.

U.S. Appl. No. 13/164,672 to Nat Thirasuttakorn et al., filed Jun. 20, 2014.

U.S. Appl. No. 13/234,042 to Baumann et al., filed Sep. 15, 2011.

U.S. Appl. No. 13/234,047 to Wojcik, filed Sep. 15, 2011.

U.S. Appl. No. 13/235,276 to Hawthorne et al., filed Sep. 16, 2011.

U.S. Appl. No. 13/234,031 to Baumann et al., filed Sep. 15, 2011.

U.S. Appl. No. 13/165,783 to Jain et al., filed Jun. 21, 2011.

International Search Report and The Written Opinion, for International Patent Application No. PCT/US2011/058469, dated Mar. 10, 2015.

"A Process for Selective Routing of Servlet Content to Transcoding Modules," Research Disclosure 422124, Jun. 1999, pp. 889-890, IBM Corporation.

"BIG-IP Controller with Exclusive OneConnect Content Switching Feature Provides a Breakthrough System for Maximizing Server and Network Performance," F5 Networks, Inc. Press Release, May 8, 2001, 2 pages, Las Vegas, Nevada.

"Servlet/Applet/HTML Authentication Process With Single Sign-On," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

"Windows Server 2003 Kerberos Extensions," Microsoft TechNet, 2003 (Updated Jul. 31, 2004), http://technet.microsoft.com/en-us/library/cc738207, Microsoft Corporation, 8 pages.

Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.

Author Unknown, "WebSEAL Administration Guide: Version 6.1". Published by IBM, 2008 (month unknown), 1104 pages.

Client Cert Storage Requirements. NagaSAM, last accessed Nov. 18, 2010, Main.natarajan, Jun. 5, 2008, (https://peterpan.f5net.com/twiki/bin/view/TMOS/NagaSAMClientCertStorageRQ).

Crescendo Networks, "Application Laver Processing (ALP)," 2003-2009, pp. 168-186, Chapter 9, CN-5000E/5500E, Foxit Software Company.

Extended European Search Report for European Patent Application No. 11837231.7, dated Mar. 10, 2015.

F5 Networks Inc., "Configuration Guide for Local Traffic Management," F5 Networks Inc., Jan. 12, 2006, version 9.2.2, 406 pgs.

F5. The BIG-IP system automatically caches SSL client certificates. Original Publication Date: May 5, 2010. Updated Date: Apr. 12, 2012. Available online: http://support.f5.com/kb/en-us/solutions/public/11000/400/sol11482.html.

Fielding et al., "Hypertext Transfer Protocol—HTTP/1.1," Network Working Group, RFC: 2068, Jan. 1997, pp. 1-162.

Fielding et al., "Hypertext Transfer Protocol—HTTP/1.1," Network Working Group, RFC: 2616, Jun. 1999, pp. 1-176.

(56) References Cited

OTHER PUBLICATIONS

Floyd et al., "Random Early Detection Gateways for Congestion Avoidance," Aug. 1993, pp. 1-22, IEEE/ACM Transactions on Networking, California.

Freier et al., "The SSL Protocol: Version 3.0." Nov. 18, 1996. Internet Engineering Task Force (IETF), Transport Layer Security Working Group.

Fu et al., "Dos and Don'ts of Client Authentication on the Web," MIT, Sep. 2011 http://pdos.csail.mit.edu/cookies/pubs/webauth:tr.pdf.

Hewlett Packard. "SSL Programming Tutorial." May 18, 2007. Available http://web.archive.org/web/20070518124141/http://h71000.www7.hp.com/DOC/83final/BA554_90007/ch04s03.html.

Hochmuth, Phil, "F5, CacheFlow pump up content-delivery lines," Network World Fusion, May 4, 2001, 1 page, Las Vegas, Nevada.

International Search Report and Written Opinion, for International Patent Application No. PCT/US2011/058469, dated May 30, 2012.

International Search Report and Written Opinion for International Patent Application No. PCT/US2011/058174, dated May 4, 2012.

International Search Report and Written Opinion for International Patent Application No. PCT/US2013/026615, dated Jul. 4, 2013.

Jelenkovic et al., "Near optimality of the discrete persistent access caching algorithm." 2005 International Conference on Analysis of Algorithms. pp. 201-222.

Kozierok, "The TCP/IP guide: a comprehensive, illustrated Internet protocols reference." San Francisco: No Starch Press, 2005. Chapter 47 (6 pages).

Mac Vittie L., "Message-Based Load Balancing: Using F5 solutions to address the challenges of scaling Diameter, Radius, and message-oriented protocols", F5 Technical Brief, 2005, pp. 1-9, F5 Networks Inc., Seattle, Washington.

MacVittie L., "Cookies, Sessions, and Persistance." Published by: F5 Networks, Inc., Jul. 2008. 7 pages.

Owasp, "Testing for Cross site scripting", OWASP Testing Guide v2, Table of Contents, Feb. 24, 2011, pp. 1-5, (www.owasp.org/index.php/Testing_for_Cross_site_scripting).

Request Client Certificate and Pass to Application, last accessed, Dec. 16, 2009, Contributed by: alankila, p. 3. DevCentral Wiki.

Rescorla, "OpenSSL Example Programs". RTFM. Jan. 10, 2002. Includes the following files (pages): client.c (2), client.h (1), common.c (3), conunon.h (1), configure (49), configure.in (5), Makefile.in (2) read_write.c (5), read_write.h (1), Readme (3), Running (3), sclient.c (3), server.c (2), server.h (1), wclient.c (6), wclient2.c (5), wserver.c (4), wserver2.c (6). Available online:Https>//web.archive.org/web/20021208102526/http://www.rtfm.com/openssl-examples/openssl-examples-20020110.tar.gz.

Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.

Siles, "Session Management Cheat Sheet—OWASP". dated Jul. 29, 2011, archived Aug. 13, 2011. 12printed pages. Available online: https://web.archive.org/web/20110813022346/https://www.owasp.org/index.php/Session_Management_Cheat_Sheet.

Williams et al., "The Ultimate Windows Server 2003 System Administrator's Guide: Forwarding Authentication," 2003, 2 pages, Figure 10.7, Addison-Wesley Professional, Boston, Massachusetts.

* cited by examiner

SYSTEM AND METHOD FOR PROXYING HTTP SINGLE SIGN ON ACROSS NETWORK DOMAINS

TECHNOLOGICAL FIELD

This technology generally relates to network communication security, and more particularly, to a system and method for allowing a remote client device to access a secure network domain.

BACKGROUND

It is common for companies and universities as well as governmental institutions to have secure local network domains which allow users, once logged into the secured network domain, to access services and other objects which are securely held within the domain. A common example of a service which is utilized by a logged-in user is to print documents to a network printer. Many network systems, such as Windows™ Server 2003, utilize security features which require the user to initially provide login and password information to access the secured network domain. Once the user's credentials are verified, the user is able to subsequently access desired services within the network domain without having to continually provide password information. For example, a network system, such as the Windows™ Server system, utilizes the Kerberos security protocol to establish the logon session with the user and allows the user to access the network's services without requiring any servers to know or store that user's password.

However, current network systems that utilize internal security protocols do not provide the means to allow the user to login into the network when the user is accessing the network remotely. For example, the user may have difficulty accessing the network's authentication service when the user's computer is not directly connected to a dedicated network connection (e.g. no connected work Ethernet cable) or does not have an established VPN connection to the network. Further, current network systems do not operate to allow the user to access service resources when the user is not directly logged into the network.

What is needed is a system and method which allows a remote client device to access the network domain remotely and continually functions as a proxy to enable the remote client device to access and utilize network services without having to continually provide login credentials.

SUMMARY

In an aspect, a method for establishing and maintaining access between a secured network and a remote client device. The method comprises receiving a request from a remote client device to access a secured network domain, wherein the login request includes a user's client certificate encrypted with a first security protocol. The method comprises verifying the client certificate to determine whether the user can access the secured network domain, wherein the secured network domain is accessed using a second security protocol different from the first security protocol. The method comprises establishing a connection between the remote client device and a dedicated server of the secured network domain after the user has been verified to access the secured network domain. The method comprises receiving a service request from the remote client device to obtain a network service from a resource server in the secured network domain. The method comprises fetching a service ticket from the dedicated server for the service request. The method comprises forwarding the service ticket to the remote client device, wherein the remote client device receives the network service from the resource server.

In an aspect, a machine readable medium having stored thereon instructions for establishing and maintaining access between a secured network and a remote client device. The medium comprises machine executable code which when executed by at least one machine, causes the machine to receive a login request from a remote client device, wherein the login request includes authentication information encrypted with a first security protocol. The machine receives a request from a remote client device to access a secured network domain, wherein the login request includes a user's client certificate encrypted with a first security protocol. The machine verifies the client certificate to determine whether the user can access the secured network domain, wherein the secured network domain is accessed using a second security protocol different from the first security protocol. The machine establishes a connection between the remote client device and a dedicated server of the secured network domain after the user has been verified to access the secured network domain. The machine receives a service request from the remote client device to obtain a network service from a resource server in the secured network domain. The machine fetches a service ticket from the dedicated server for the service request. The machine forwards the service ticket to the remote client device, wherein the remote client device receives the network service from the resource server.

In an aspect, a network traffic manager for establishing and maintaining access between a secured network and a remote client device. The network traffic manager comprises a server interface configured to communicate with a dedicated server and a resource server in a secured network. A network interface coupled to a remote client device via a network, the network interface receiving a login request from the remote client device, wherein the login request includes authentication information, the authentication information encrypted with a first security protocol. A controller is coupled to the server interface and the network interface. The controller is operative to receive a request from a remote client device to access a secured network domain, wherein the login request includes a user's client certificate encrypted with a first security protocol. The controller is operative to verify the client certificate to determine whether the user can access the secured network domain, wherein the secured network domain is accessed using a second security protocol different from the first security protocol. The controller is operative to establish a connection between the remote client device and a dedicated server of the secured network domain after the user has been verified to access the secured network domain. The controller is operative to receive a service request from the remote client device to obtain a network service from a resource server in the secured network domain. The controller is operative to fetch a service ticket from the dedicated server for the service request. The controller is operative to forward the service ticket to the remote client device, wherein the remote client device receives the network service from the resource server.

Figure 1:
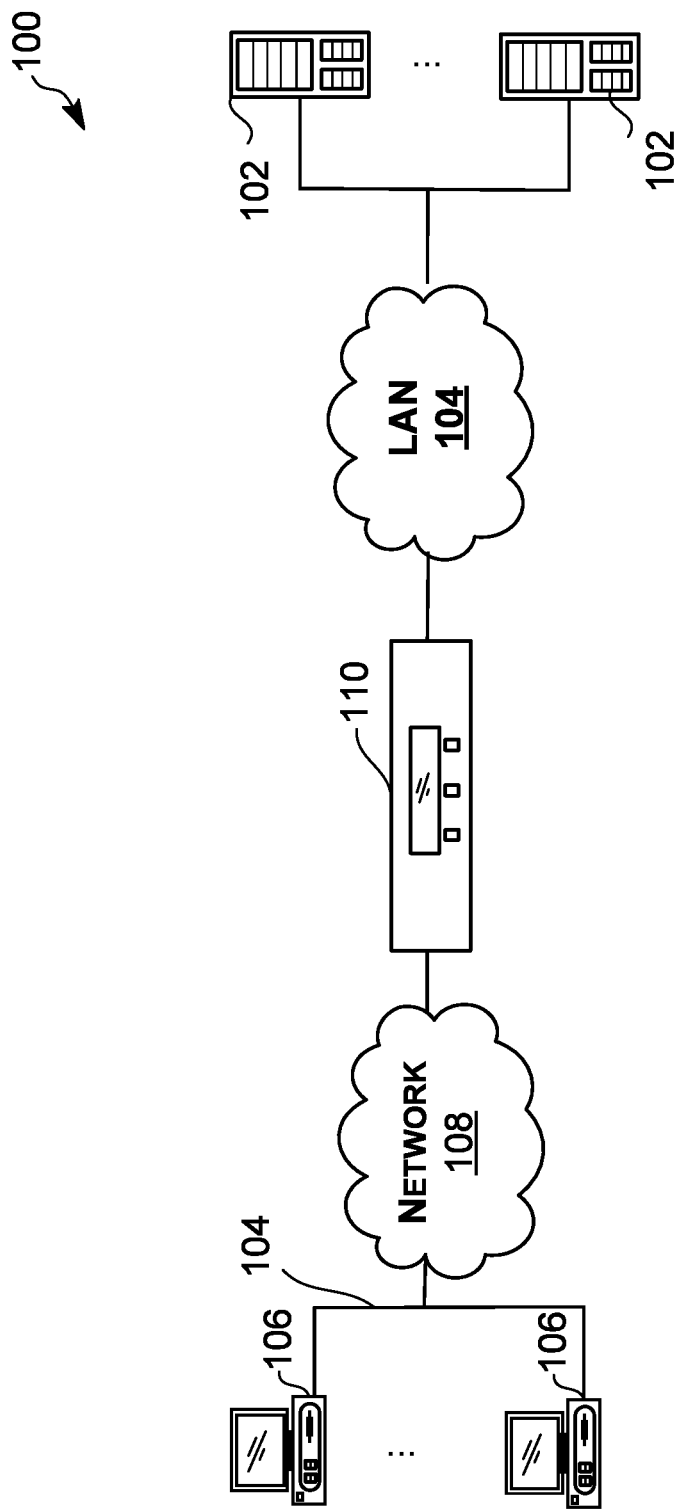
FIG. 1 is a diagram of an example system environment that includes a network traffic manager in accordance with an aspect of the present disclosure.

While these examples are susceptible of embodiment in many different forms, there is shown in the drawings and will herein be described in detail preferred examples with the understanding that the present disclosure is to be considered as an exemplification and is not intended to limit the broad aspect to the embodiments illustrated.

DETAILED DESCRIPTION

Referring now to FIG. 1, an example system environment 100 employs a network traffic management device 110 that is capable of proxying one or more remote client devices 106 into a network domain. The example system environment 100 includes one or more servers 102, one or more client devices 106 and the traffic management device 110, although the environment 100 could include other numbers and types of devices in other arrangements. The network traffic management device 110 is coupled to the server(s) 102 and the via local area network (LAN) 104 and client devices 106 via network 108. Generally, requests sent over the network 108 from client devices 106 towards the servers 102 are received by traffic management device 110.

Client devices 106 comprise computing devices capable of connecting to other computing devices, such as the network traffic management device 110 and the servers 102. Such connections are performed over wired and/or wireless networks, such as network 108, to send and receive data. Such connections include, but are not limited to, sending Web-based requests, receiving responses to requests and/or performing other tasks. Non-limiting and non-exhausting examples of such devices include personal, commercial or industrial specific computers (e.g., desktops, laptops), mobile, kiosks, and/or smart phones and the like. In an example, client devices 106 can run Web browsers that may provide an interface for operators, such as human users, to interact with for making requests for resources to different web server-based applications or Web pages via the network 108, although other server resources may be requested by clients. One or more Web-based applications may run on the web application server 102 that provide the requested data back to one or more exterior network devices (e.g. client devices 106).

Network 108 comprises a publicly accessible network, such as the Internet, which includes client devices 106. However, it is contemplated that the network 108 may comprise other types of private and public networks that include other devices. Communications, such as requests from clients 106 and responses from servers 102, take place over the network 108 according to standard network protocols, such as the HTTP and TCP/IP protocols in this example. However, the principles discussed herein are not limited to this example and can include other protocols. Further, it should be appreciated that network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. In essence, the network 108 includes any communication method by which data may travel between client devices 106, Web application servers 102 and network traffic management device 110, and the like.

LAN 104 comprises a private local area network that includes the network traffic management device 110 coupled to the one or more servers 102, although the LAN 104 may comprise other types of private and public networks with other devices. Networks, including local area networks, besides being understood by those skilled in the relevant arts, have already been generally described above in connection with network 108 and thus will not be described further.

The server 102 comprises one or more server computing machines capable of operating one or more Web-based or non-Web-based applications that may be accessed by network devices in the network 108. Such network devices include client devices 106, via the network traffic management device 110, and may provide other data representing requested resources, such as particular Web page(s), image (s) of physical objects, and any other objects resources (e.g., printers) and/or security principals (e.g. user or computer accounts and groups). It should be noted that the server 102 may perform other tasks and provide other types of resources. It should be noted that while only two servers 102 are shown in the environment 100 depicted in FIG. 1, other numbers and types of servers may be coupled to the network traffic management device 110. It is also contemplated that one or more of the servers 102 may be a cluster of servers managed by the network traffic management device 110.

As per the TCP/IP protocols, requests from the requesting client devices 106 may be sent as one or more streams of data packets over network 108 to the network traffic management device 110 and/or the servers 102. Such protocols can establish connections, send and receive data for existing connections, and the like. It is to be understood that the one or more Web application servers 102 may be hardware and/or software, and/or may represent a system with multiple servers that may include internal or external networks. In this example, the Web application servers 102 may be any version of Microsoft® IIS servers or Apache® servers, although other types of servers may be used. Further, additional servers may be coupled to the network 108 and many different types of applications may be available on servers coupled to the network 108.

Each of the Web application servers 102 and client devices 106 may include one or more central processing units (CPUs), one or more computer readable media (i.e., memory), and interface systems that are coupled together by internal buses or other links as are generally known to those of ordinary skill in the art.

As shown in the example environment 100 depicted in FIG. 1, the network traffic management device 110 is interposed between client devices 106 in network 108 and the servers 102 in LAN 104. Again, the environment 100 could be arranged in other manners with other numbers and types of devices. Also, the network traffic management device 110 is coupled to network 108 by one or more network communication links and intermediate network devices (e.g. routers, switches, gateways, hubs and the like) (not shown). It should be understood that the devices and the particular configuration shown in FIG. 1 are provided for exemplary purposes only and thus are not limiting.

Generally, the network traffic management device 110 manages network communications, which may include one or more client requests and server responses, from/to the network 108 between the client devices 106 and one or more of the Web application servers 102 in LAN 104. These requests may be destined for one or more servers 102, and may take the form of one or more TCP/IP data packets originating from the network 108. The requests pass through one or more intermediate network devices and/or intermediate networks, until they ultimately reach the traffic management device 110. In any case, the network traffic management device 110 may manage the network communications by performing several network traffic related functions involving the communications. Such functions include, but are not limited to, load balancing, access control, and validating HTTP requests using JavaScript code that are sent back to requesting client devices 106 in accordance with the processes described further below.

Figure 2:
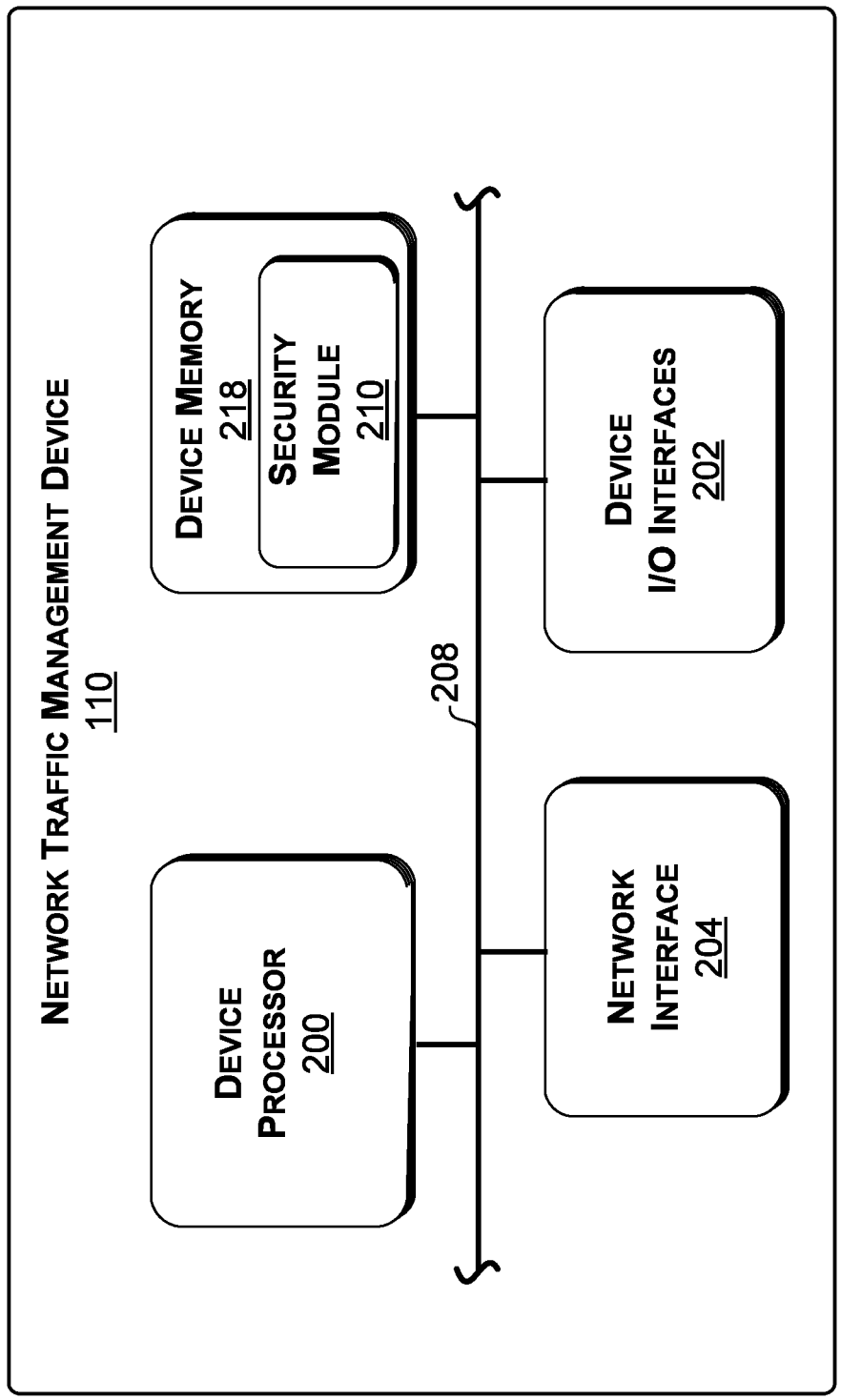
FIG. 2 is a block diagram of the network traffic manager shown in FIG. 1.

Referring now to FIG. 2, an example network traffic management device 110 includes a device processor 200, device I/O interfaces 202, network interface 204 and device memory 218, which are coupled together by bus 208. It should be noted that the device 110 could include other types and numbers of components.

Device processor 200 comprises one or more microprocessors configured to execute computer/machine readable and executable instructions stored in device memory 218. Such instructions implement network traffic management related functions of the network traffic management device 110. In addition, the instructions implement the security module 210 to perform one or more portions of the processes illustrated in FIG. 3 for protecting the system. It is understood that the processor 200 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like. The processor is programmed or configured according to the teachings as described and illustrated below.

Device I/O interfaces 202 comprise one or more user input and output device interface mechanisms. The interface may include a computer keyboard, mouse, display device, and the corresponding physical ports and underlying supporting hardware and software to enable the network traffic management device 110 to communicate with the outside environment. Such communication may include accepting user data input and to provide user output, although other types and numbers of user input and output devices may be used. Additionally or alternatively, as will be described in connection with network interface 204 below, the network traffic management device 110 may communicate with the outside environment for certain types of operations (e.g., configuration) via a network management port.

Network interface 204 comprises one or more mechanisms that enable network traffic management device 110 to engage in TCP/IP communications over LAN 104 and network 108. However, it is contemplated that the network interface 204 may be constructed for use with other communication protocols and types of networks. Network interface 204 is sometimes referred to as a transceiver, transceiving device, or network interface card (NIC), which transmits and receives network data packets to one or more networks, such as LAN 104 and network 108. In an example where the network traffic management device 110 includes more than one device processor 200 (or a processor 200 has more than one core), each processor 200 (and/or core) may use the same single network interface 204 or a plurality of network interfaces 204. Further, the network interface 204 may include one or more physical ports, such as Ethernet ports, to couple the network traffic management device 110 with other network devices, such as the servers 102. Moreover, the interface 204 may include certain physical ports dedicated to receiving and/or transmitting certain types of network data, such as device management related data for configuring the network traffic management device 110.

Bus 208 may comprise one or more internal device component communication buses, links, bridges and supporting components, such as bus controllers and/or arbiters. The bus enables the various components of the network traffic management device 110, such as the processor 200, device I/O interfaces 202, network interface 204, and device memory 218, to communicate with one another. However, it is contemplated that the bus may enable one or more components of the network traffic management device 110 to communicate with components in other devices as well. Example buses include HyperTransport, PCI, PCI Express, InfiniBand, USB, Firewire, Serial ATA (SATA), SCSI, IDE and AGP buses. However, it is contemplated that other types and numbers of buses may be used, whereby the particular types and arrangement of buses will depend on the particular configuration of the network traffic management device 110.

Device memory 218 comprises computer readable media, namely computer readable or processor readable storage media, which are examples of machine-readable storage media. Computer readable storage/machine-readable storage media may include volatile, nonvolatile, removable, and non-removable media implemented in any method or technology for storage of information. Such storage media contains computer readable/machine-executable instructions, data structures, program modules, or other data, which may be obtained and/or executed by one or more processors, such as device processor 200. Such instructions allow the processor to perform actions, including implementing an operating system for controlling the general operation of network traffic management device 110 to manage network traffic and implementing security module 210 to perform one or more portions of the process discussed below.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic storage devices, or any other medium which can be used to store the desired information. Such desired information includes data and/or computer/machine-executable instructions and which can be accessed by a computing or specially programmed device, such as network traffic management device 110. Security module 210 is depicted in FIG. 2 as being within memory 218 for exemplary purposes only; it should be appreciated the module 210 may be alternatively located elsewhere.

Although an example of the server 102, network traffic device 110, and client devices 106 are described and illustrated herein in connection with FIGS. 1 and 2, each of the computers of the system 100 could be implemented on any suitable computer system or computing device. It is to be understood that the example devices and systems of the system 100 are for exemplary purposes, as many variations of the specific hardware and software used to implement the system 100 are possible, as will be appreciated by those skilled in the relevant art(s).

In addition, two or more computing systems or devices may be substituted for any one of the devices in the system 100. Accordingly, principles and advantages of distributed processing, such as redundancy, replication, and the like, also can be implemented, as desired, to increase the robustness and performance of the devices and systems of the system 100. The system 100 may also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

Figure 3:
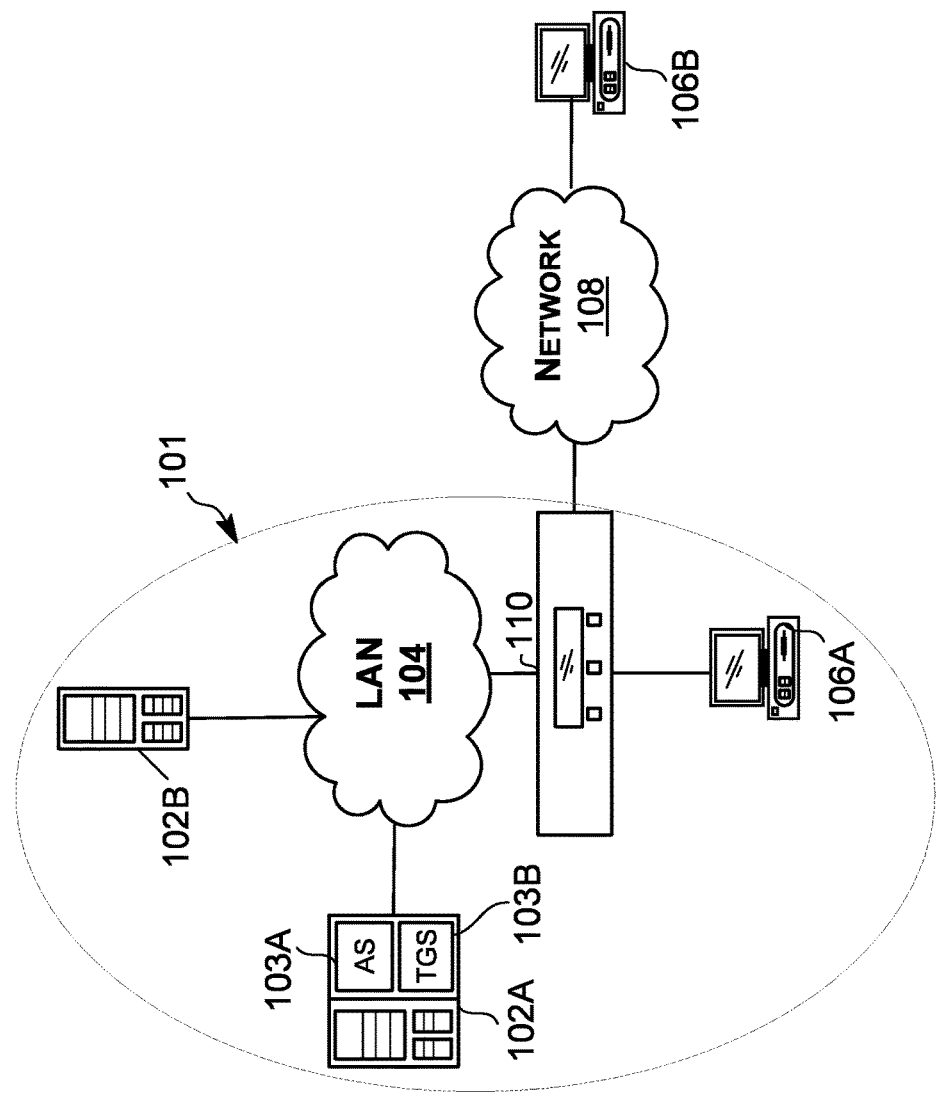
FIG. 3 is a diagram of an example system environment that includes a network traffic manager in accordance with an aspect of the present disclosure.

FIG. 3 illustrates an example system environment which employs a network traffic management device 110 that is capable of proxying one or more remote non-domain client devices 106B outside an established network domain 101 to access and obtain services from the domain 101 with a single sign credentials. In an example aspect, the network domain 101 includes one or more network domain-dedicated servers 102A (hereinafter "dedicated server"); one or more network domain-resource servers 102B (hereinafter "resource server"); and one or more network traffic management devices 110 which communicate with the dedicated server 102A and the resource server 102B via the LAN 104.

In an aspect, the dedicated server 102A operates as a Key Distribution Center (KDC) and has two server components: an active directory server (AS) 103A and ticket granting server (TGS) 103B. The dedicated server 102A maintains a database of secret keys, each of which is specific to a particular entity in the network 101, whether it is a client device 106A or a server 102B. Thus, when client device 106A communicates with the dedicated server 102A, both the server 102A and the device 106A a common secret key known only to the device 106A and the server 102A. Thus, knowledge of this key serves to prove the client device's identity to the dedicated server 102A.

When a client device 106A needs to communicate with another entity in the domain 101, such as requesting a service from the resource server 102B, the dedicated server 102A will generate a session key, in response to a request from the client device 106A, which can be used to secure communications between the two entities. Thus, the client device 106A can access one or more services from the resource server 102B only after it has received the service ticket from the dedicated server 102A.

In particular, the resource server 102B allows the client device 106A to access one or more network resources or services (e.g. domain secured web applications, printers, shared folders, email server) and/or security principals (e.g. user accounts, computer accounts and groups).

When the client device 106A initially logs on to the network domain 101, the user, via the client device 106A negotiates access to the network 101 by providing his or her username and password information. The client device 106A preferably performs a one-way function, such as a hash, on the entered password, whereby the hash becomes the secret key of the client device 106A or user. The dedicated server 102A and the client device 106A share the secret key information which is specific to the client device 106A to verify the user's credentials and ensure that the user is authorized to access the network 101. Once successfully authenticated, the client device 106A is logged into the network domain 101 and can request one or more services from the resource server 102B. In particular, if the user needs to access an available service from the resource server 102B (e.g. domain-based web page), the client device 106A requests a Ticket to Get Tickets (TGT) for that particular service from the TGS 103B of the dedicated server 102A.

The TGS 103B of the dedicated server 102A, already having verified that the user can request services from the resource server 102B, replies and provides the client device 106A a service ticket for the requested service. The service ticket has a lifetime of a predetermined amount (e.g. 10 hours) and may be renewed throughout the user's log-on session. In an aspect, the service ticket is cached locally on the client device 106A in which the service ticket can be repeatedly used to request and access services within the domain 101 without having to continually provide password information.

The client device 106A thereafter sends a service request to the resource server 102B along with the service ticket previously received from the TGS 103B. The resource server 102B, upon receiving the service request with the service ticket, provides the client device 106A with the access without having to verify that the client device 106A has access to the service.

As shown in FIG. 3, the network traffic management device 110 performs communications between the client device 106A and the dedicated server 102A as well as the resource server 102B. The network traffic management device 110, in accordance with the present disclosure, is configured to operate as a proxy server to allow a remote client device 106B that is not within the domain 101 to access the network domain 101 and receive one or more desired services from the resource server 102B.

In FIG. 3, the client device 106B is not within the network domain 101 and is thus not able to directly access the dedicated server 102A to request a ticket from the TGS 103B. In accordance with the present disclosure, the remote client device 106B connects to the network traffic management device 110 and sends a secure, encrypted client certificate to the network traffic management device 110 via the network in a secured manner. The client certificate is secured by a strong encryption technology (e.g. SSL) and can be in the form of a Common Access Card (CAC) reader, Federal Information Processing Standard (FIPS) verifier, PKI certificate or other appropriate like means.

In an aspect, the security protocol utilized between the remote client device 106B and the network domain 101 is the same as the security protocol utilized between entities within the network domain 101. However, it is contemplated, in an aspect, the security protocol utilized between the remote client device 106B and the network domain 101 (e.g. SSL) is different from the security protocol utilized between entities within the network domain 101 (Microsoft™ Active Directory). Nonetheless, the present disclosure allows communications between two or more entities by the use of protocol transitioning where the authentication information of the requesting user (e.g CAC information) is in the form which cannot be used to directly access and receive services within the network domain 101. It should be noted that although Active Directory and Kerberos protocols are discussed in the example above, other network services and authentication protocols may be used with the network traffic management device 110 acting as a proxy with the non-domain client device 106B.

The network traffic management device 110 is configured to receive the user's encrypted client certificate and processes the client certificate to verify that the user has clearance to access the network domain 101. In an aspect, all or a portion of the client certificate sent from the client device 106B is encrypted by the client device 106B with a private key. The network traffic management device 110 contains a stored public key which is used to decrypt the encrypted portion to verify that the user's credentials. In other words, if the public key, applied by the network traffic management device 110, is able to successfully decrypt the encrypted portion of the client certificate, the network traffic management device 110 will conclude that the user can access the network domain 101 requiring knowledge of the user's password or private key information.

Further, once the logon session has been established, the network traffic management device 110 functions as a proxy server between the remote client device 106B and the dedicated server 102A as well as the resource server 102B to allow the remote client device 106B to access and obtain services within the secured network domain 101 without requiring the remote client device 106B to provide authentication information every time a service is requested. In particular, the network traffic management device 110 communicates with the dedicated server 102A and requests or "fetches" a ticket from the TGS 103B on behalf of the remote client device 106B when the device 106B requests a network resource from the network domain 101. In particular, the request from the network traffic management device 100 will identify the verified entity requesting the service (e.g. client device 106B) as well as which entity the resource is requested from (e.g. resource server 102B). The network traffic management device 110, upon receiving the ticket, will forward the ticket to the remote client device 106B, whereby the remote client device 106B will then be able to access and receive appropriate services, in regards to the ticket, from the resource server 102B.

Figure 4:
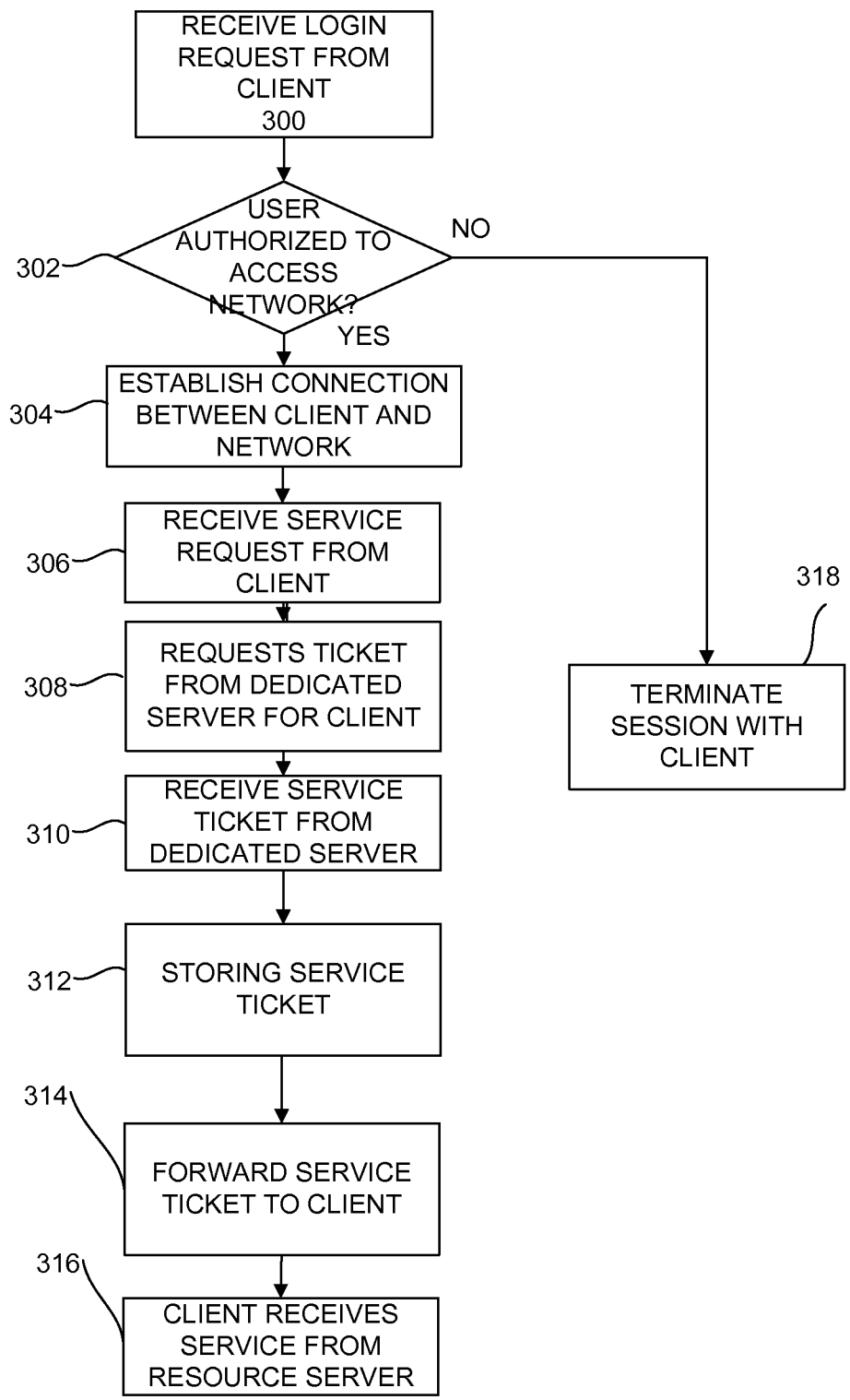
FIG. 4 is an example flow chart diagram depicting portions of processes for initiating connection and proxying requests and services between a remote client device and the network domain.

FIG. 4 illustrates an example flow chart diagram depicting portions of processes for initiating and maintaining connection as well as proxying requests and services between a remote client device 106B and the network domain 101. Initially, the network traffic management device 110 receives a login request from the remote client device 106B over the network 108 (block 300). The login request includes authentication information which is encrypted with a security protocol, such as a SSL protocol. Upon receiving the authentication information, the network traffic management device 110 verifies the authentication information, as described above, to ensure that the user has clearance to access the secured network domain 101 (Block 302). Upon confirming the user's credentials, the network traffic management device 110 establishes a connection between the remote client device 106B and the secured network 101 (Block 304).

When the user wishes to access a service within the network domain (e.g. retrieve email, print to a network printer), the remote client device 106B sends a service request to the network domain 101. The network traffic management device 110 receives the service request (Block 306) and knowing that the user has a trusted relationship with the network domain 101, performs protocol transitioning and fetches or requests a ticket from the dedicated server 102A (Block 308). As discussed above, the ticket granting request sent from the network traffic management device 110 is specific to the type of service that the remote client device 106B is trying to obtain and also identifies the requesting identity (e.g. 106B). In the example, the dedicated server 102A replies to the request and provides a service ticket in conformance with the network's security protocol which is received by the network traffic management device 110 (Block 310).

Thereafter, the network traffic management device 110 stores the service ticket locally (Block 312). This allows the service ticket to be repeatedly used to request and access services within the domain 101 without the remote client device 106B to continue to verified for all subsequent service requests, as the network traffic management device 110 will continue to act as a proxy for device 106B. Additionally, the network traffic management device 110 forwards the a service ticket to the remote client device 106B (Block 314). The service ticket provides the necessary information to allow the remote client device 106B to access the desired service from the resource server 102B. Thereafter, the remote client device 106B receives service access to the resource server (Block 316). As stated above, the service ticket has a lifetime of a predetermined amount (e.g. 10 hours) and may be renewed throughout the user's log-on session.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed system and/or processes to any order except as may be specified in the claims. Accordingly, the system and method is limited only by the following claims and equivalents thereto.

What is claimed is:

1. A method, the comprising:
authenticating, by a network traffic management device and utilizing a first security protocol, a user of a remote client device in response to receiving a login request from the remote client device to access a secured network domain, wherein the login request includes a client certificate, which is encrypted in the first security protocol;
establishing, by the network traffic management device, a first connection between the remote client device and the secured network domain after the user has been verified to access the secured network domain;
receiving, by the network traffic management device, a service request from the remote client device to obtain a network service from a resource server in the secured network domain, transitioning, by the network traffic management device, to a second security protocol, sending, by the network traffic management device, a ticket granting request that is specific to the type of service request to a dedicated server, obtaining, by the network traffic management device, a service ticket from the dedicated server in the secured network domain for the service request in the second security protocol, locally storing, by the network traffic management device, the service ticket to allow the service ticket to be repeatedly used to request and access services within the secured domain, and providing, by the network traffic management device, access to the network service using the service ticket in response to the service request;
receiving, by the network traffic management device, another service request from the remote client device to obtain the network service from the resource server in the secured network domain; and providing, by the network traffic management device, access to the network service using the stored service ticket in response to the another service request received from the remote client device to obtain the network service from the resource server and without communicating with the dedicated server from which the service ticket was previously obtained or authenticating the user.

2. The method of claim 1, wherein the service ticket is valid for an amount of time and the method further comprises:

storing the service ticket from the dedicated server for the service request as associated with the amount of time;

determining when the service ticket is valid based on the amount of time; and sending the service ticket to the remote client device in response to the another service request, when the determining indicates the service ticket is valid based on the amount of time.

3. The method of claim 1, wherein the second security protocol is a Kerberos-based authentication protocol or the client certificate is within a Common Access Card (CAC).

4. The method of claim 1, wherein the first security protocol is different than the second security protocol.

5. The method of claim 1, wherein the network service is a password protected web page.

6. A non-transitory machine readable medium having stored thereon instructions for establishing access between a secured network and a remote client device, comprising machine executable code which when executed by one or more processors, causes the one or more processors to:

authenticate, utilizing a first security protocol, a user of a remote client device in response to receiving a login request from the remote client device to access a secured network domain, wherein the login request includes a client certificate, which is encrypted in the first security protocol;

establish a first connection between the remote client device and the secured network domain after the user has been verified to access the secured network domain;

receive a service request from the remote client device to obtain a network service from a resource server in the secured network domain, transition to a second security protocol, send a ticket granting request that is specific to the type of service request to a dedicated server, obtain a service ticket from a dedicated server in the secured network domain for the service request in the second security protocol locally store the service ticket to allow the service ticket to be repeatedly used to request and access services within the secured domain, and provide access to the network service using the service ticket in response to the service request;

receive another service request from the remote client device to obtain the network service from the resource server in the secured network domain; and provide access to the network service using the stored service ticket in response to the another service request received from the remote client device to obtain the network service from the resource server and without communicating with the dedicated server from which the service ticket was previously obtained or authenticating the user.

7. The machine readable medium of claim 6, wherein service ticket is valid for an amount of time and the machine executable code when executed by the one or more processors further causes the one or more processors to perform:

store the service ticket from the dedicated server for the service request as associated with the predetermined amount of time;

determine when the service ticket is valid based on the predetermined amount of time; and send the service ticket to the remote client device in response to the another service request, when the determining indicates the service ticket is valid based on the predetermined amount of time.

8. The machine readable medium of claim 6, wherein the second security protocol is a Kerberos-based authentication protocol or the client certificate is within a Common Access Card (CAC).

9. The machine readable medium of claim 6, wherein the first security protocol is different than the second security protocol.

10. The machine readable medium of claim 6, wherein the network service is a password protected web page.

11. A network traffic management device comprising memory comprising programmed instructions stored thereon and at least one processor coupled to the memory and configured to be capable of executing the stored programmed instructions to:

authenticate, utilizing a first security protocol, a user of a remote client device in response to receiving a login request from the remote client device to access a secured network domain, wherein the login request includes a client certificate, which is encrypted in the first security protocol;

establish a first connection between the remote client device and the secured network domain after the user has been verified to access the secured network domain;

receive a service request from the remote client device to obtain a network service from a resource server in the secured network domain, transition to a second security protocol, send a ticket granting request that is specific to the type of service request to a dedicated server, obtain a service ticket from a dedicated server in the secured network domain for the service request in the second security protocol, locally store the service ticket to allow the service ticket to be repeatedly used to request and access services within the secured domain, and provide access to the network service using the service ticket in response to the service request;

receive another service request from the remote client device to obtain the network service from the resource server in the secured network domain; and provide access to the network service using the stored service ticket in response to the another service request received from the remote client device to obtain the network service from the resource server and without communicating with the dedicated server from which the service ticket was previously obtained or authenticating the user.

12. The device as set forth in claim 11 wherein the service ticket is valid for an amount of time and the processor is further configured to be capable of executing the stored programmed instructions to:

store the service ticket from the dedicated server for the service request as associated with the amount of time;

determine when the service ticket is valid based on the amount of time; and send the service ticket to the remote client device in response to the another service request, when the determining indicates the service ticket is valid based on the amount of time.

13. The device as set forth in claim 11 wherein the second security protocol is a Kerberos-based authentication protocol or the client certificate is within a Common Access Card (CAC).

14. The device as set forth in claim 11 wherein the first security protocol is different than the second security protocol.

15. The device as set forth in claim 11 wherein the network service is a password protected web page.

16. A network traffic management system comprising one or more network traffic management devices, dedicated servers, or resource servers, the network traffic management system comprising memory comprising programmed instructions stored thereon and one or more processors configured to be capable of executing the stored programmed instructions to:
   authenticate, utilizing a first security protocol, a user of a remote client device in response to receiving a login request from the remote client device to access a secured network domain, wherein the login request includes a client certificate, which is encrypted in the first security protocol;
   establish a first connection between the remote client device and the secured network domain after the user has been verified to access the secured network domain;
   receive a service request from the remote client device to obtain a network service from a resource server in the secured network domain, transition to a second security protocol, send a ticket granting request that is specific to the type of service request to a dedicated server, obtain a service ticket from the dedicated server in the secured network domain for the service request in the second security protocol, locally store the service ticket to allow the service ticket to be repeatedly used to request and access services within the secured domain, and provide access to the network service using the service ticket in response to the service request;
   receive another service request from the remote client device to obtain the network service from the resource server in the secured network domain; and
   provide access to the network service using the stored service ticket in response to the another service request received from the remote client device to obtain the network service from the resource server and without communicating with the dedicated server from which the service ticket was previously obtained or authenticating the user.

17. The system of claim 16, wherein the service ticket is valid for an amount of time and the one or more processors are further configured to be capable of executing the stored programmed instructions to:
   store the service ticket from the dedicated server for the service request as associated with the amount of time;
   determine when the service ticket is valid based on the amount of time; and
   send the service ticket to the remote client device in response to the another service request, when the determining indicates the service ticket is valid based on the amount of time.

18. The system of claim 16, wherein the second security protocol is a Kerberos-based authentication protocol or the client certificate is within a Common Access Card (CAC).

19. The system of claim 16, wherein the first security protocol is different than the second security protocol.

20. The system of claim 16, wherein the network service is a password protected web page.

* * * * *